Nov. 21, 1950  E. V. ALBERT ET AL  2,531,243
FUEL-AIR RATIO CONTROLLER
Filed Sept. 19, 1946  2 Sheets-Sheet 1

INVENTOR
EDWARD V. ALBERT
THOMAS H. RANDALL, JR.
EVERETT M. BARBER
BY Daniel Stryker
ATTORNEY Nov. 21, 1950     E. V. ALBERT ET AL     2,531,243
FUEL-AIR RATIO CONTROLLER
Filed Sept. 19, 1946     2 Sheets-Sheet 2
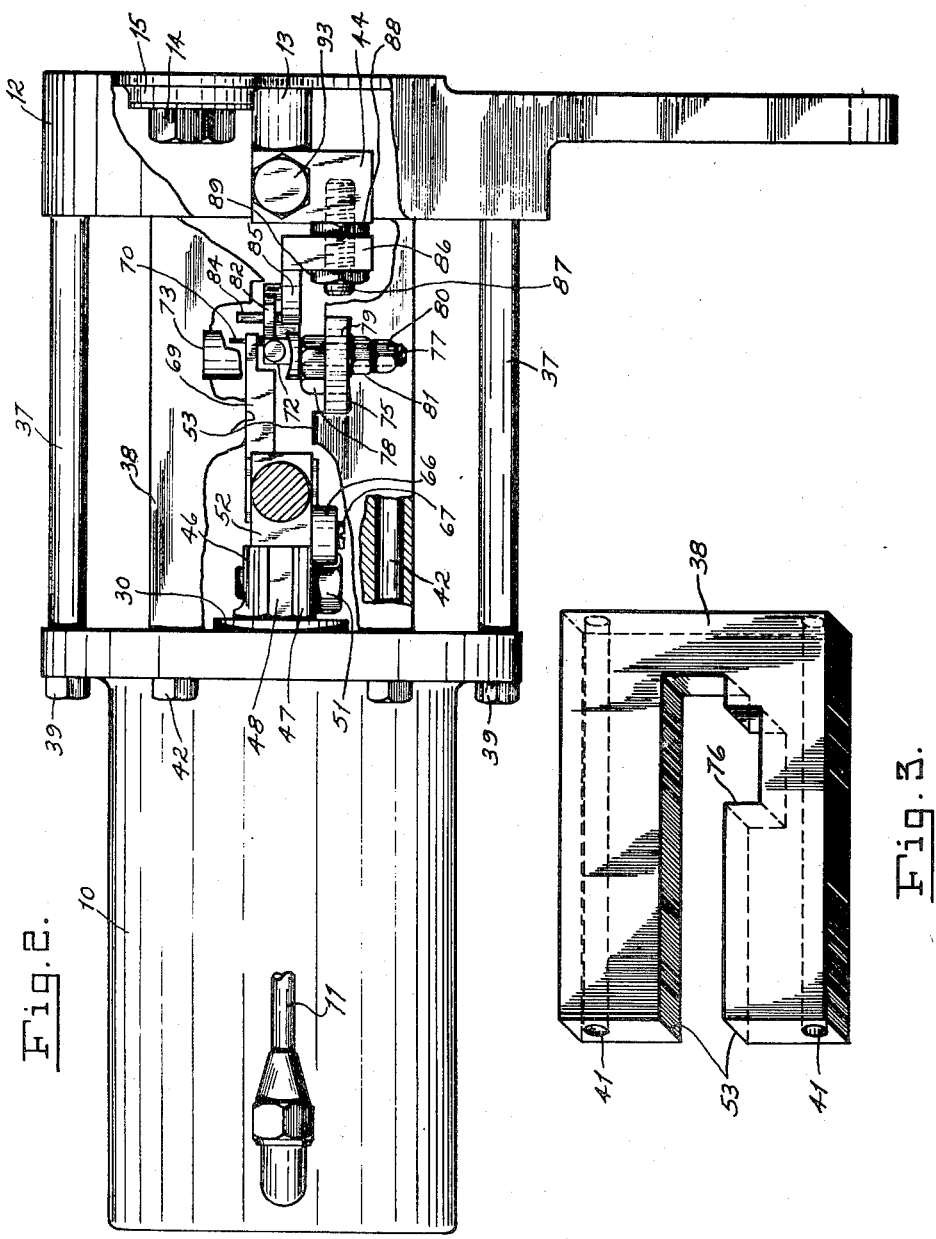
INVENTOR
EDWARD V. ALBERT
THOMAS H. RANDALL, JR.
EVERETT M. BARBER
BY Daniel Stryker
ATTORNEY Patented Nov. 21, 1950

2,531,243

UNITED STATES PATENT OFFICE 2,531,243

FUEL-AIR RATIO CONTROLLER

Edward V. Albert, New Rochelle, Thomas H. Randall, Jr., Beacon, and Everett M. Barber, Wappingers Falls, N. Y., assignors to The Texas Company, New York, N. Y., a corporation of Delaware Application September 19, 1946, Serial No. 698,016

10 Claims. (Cl. 74—522)

This invention relates to a fuel-air ratio controller for a supercharged fuel-injection internal combustion engine.

In a supercharged engine operating with fuel injection, variation in the density of the air supplied by the supercharger to the air intake manifold necessitates a corresponding variation in the volume of fuel supplied to the injector on each cycle in order to maintain a predetermined fuel-air weight ratio. Heretofore, a controller for this purpose has been provided comprising a spring counter-balanced piston mounted within a cylinder, the interior of which is connected by a fluid line to the air intake manifold so that the piston is movable in response to changing air pressure, and with the piston directly connected to the rack control of the fuel pump supplying the injection line leading to the engine cylinders. Movement of the piston, in response to changing air pressure, effected corresponding movement of the rack control of the fuel pump which regulated the volume of the liquid fuel supplied to the injectors on each cycle, to maintain a predetermined fuel-air weight ratio. This control, however, when installed and calibrated, was only capable of maintaining one predetermined fuel-air ratio with one given fuel of a certain specific gravity.

In the event of the change to a fuel of different specific gravity, or in the event of a change to a different predetermined fuel-air ratio with a given fuel, it was necessary to disassemble the parts of the controller, insert new springs of different compressive strength in the counter-balanced piston and recalibrate the controller for the new conditions.

One of the principal objects of the present invention is to provide a fuel-air ratio controller of this character which is adapted to maintain any desired fuel-air ratio within the combustible limits of engine operation, and to permit easy and quick adjustment of the controller without disassembly of the parts to select a different fuel-air ratio for a given fuel.

Another object of the present invention is to provide a fuel-air ratio controller of this character which is adapted for use with fuels of different specific gravity, and which is constructed to enable the controller to be quickly and easily adjusted without disassembly of the parts so as to maintain a predetermined fuel-air ratio for any given fuel falling within the specific gravity range of engine fuels normally encountered.

Still another object of the invention is to provide a fuel-air ratio controller of this character which is sturdy in construction, reliable in operation, and which is provided with a plurality of adjustable parts or connections which simplify the initial calibration of the device for the different fuel-air ratios and for the different fuels.

Other objects and advantages of the invention will be apparent from the following description when taken in conjunction with the accompanying drawing and appended claims.

In the drawing, which discloses a preferred embodiment of the invention,

Fig. 2 is a side elevational view of the controller with the adjusting wheel shaft of the micrometer screw in section on the plane of the line 2—2 of Fig. 1, and with other parts broken away and in section for clearness in illustration; and Fig. 3 is a perspective view of the graduated bar guide plate detached from the controller.

Figure 1:
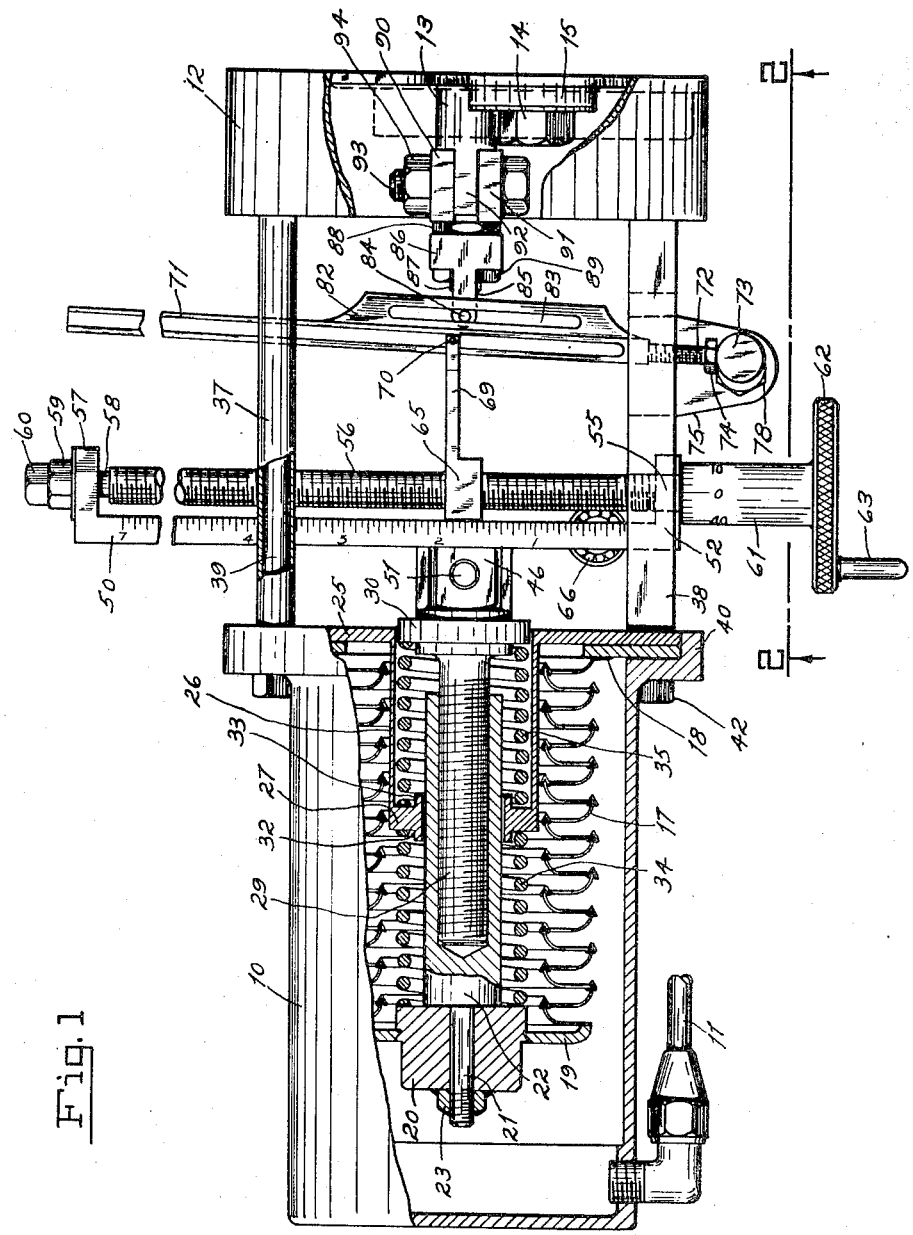
Fig. 1 is a horizontal plan view looking down on the controller, with parts broken away and in section to illustrate the construction thereof.

Referring to the drawing, a cylindrical cup-shaped housing 10 is adapted to be connected by fluid connection 11 with the air intake manifold (not shown) of the supercharged fuel injection internal combustion engine. Consequently, the interior of housing 10 is responsive to pressure of the air supplied by the supercharger to the cylinders of the engine. The numeral 12 designates an adapter which is constructed as a hollow casing open at its right hand end (Figs. 1 and 2) and adapted to be bolted to a conventional fuel pump housing, so as to overlie the protruding end of the rack 13 of the fuel pump. It will be understood that the fuel pump is of conventional type having a longitudinally slidable rack bar 13 which moves in a machined groove or bore in the pump housing, the rack bar carrying rack teeth for engaging gears on the pump plunger sleeves, whereby movement of the rack bar rotates the pump plungers and thereby regulates the volume of fuel supplied on a pumping stroke by each plunger to its respective cylinder injection nozzle. The position of the rack bar thus regulates the volume of liquid fuel injected into each cylinder on each cycle. In the drawing the fuel pump is not shown, except for the illustration of the end of the rack bar 13, together with a plug 14 closing a protruding end 15 of the pump. It will be understood that the right hand open end of the adapter 12 is fastened flush against the exterior side wall of the pump housing to thereby support the controller on the engine. In the arrangement shown, movement of the rack bar 13 to the right (Figs. 1 and 2) increases the volume of fuel supplied on each cycle, and vice versa.

Referring more particularly to Fig. 1, housing 10 confines a movable member which is responsive to changes in air pressure within the housing. In the particular embodiment shown, this movable member comprises a metal diaphragm bellows 17 soldered at one end to a retainer plate 18, and at the opposite end to a similar retainer plate 19. Plate 19 is rigidly carried by a stud connector 20, through which the unthreaded portion of the smaller diameter extension 21 of female stud 22 extends. The protruding outer end of extension 21 is threaded and receives a sealing nut 23, preventing air leakage into the interior of bellows 17. Abutting against retainer 18 is a spring retainer plate 25 having an integral inwardly extending cylindrical portion 26 terminating at its inner end in spring retainer 27. Female stud member 22 is hollow and formed with interior threads receiving in adjustable relationship the threaded end of male stud member 29. The outer end of this stud member is formed with a cylindrical enlargement 30 of slightly less external diameter than the internal diameter of cylindrical portion 26 so as to avoid undue frictional engagement upon movement of diaphragm 17 and corresponding movement of the stud members 22 and 29. At the same time member 30 guides the stud members in true longitudinal movement and prevents tilting of the parts out of line.

Stationary spring retainer 27 is formed with oppositely extending lugs 32 and 33 to more effectively retain the adjacent ends of the oppositely acting compression springs 34 and 35, respectively. The inner end of spring 34 bears against connector 20. The outer end of spring 35 acts against the cylindrical enlargement 30. The diameter of the central bore in spring retainer 27 is slightly larger than the external diameter of female stud 22 so as to permit movement of the latter without frictional engagement with the spring retainer, while at the same time maintaining proper alignment of the parts. Increase in air pressure within housing 10 compresses bellows 17 with corresponding movement of stud members 22 and 29 to the right, thereby increasing the compression in spring 34 and decreasing the compression in spring 35. Conversely, decrease in air pressure within housing 10 causes longitudinal movement of the stud members 22 and 29 to the left, with increase in compression of spring 35 and decrease in compression of spring 34. Ordinarily, the springs 34 and 35 are selected of approximately equal compressive strength, although this is not essential since the parts can be adjusted to compensate for springs of widely differing compressive strengths.

Mounted between plate 25 and adapter casing 12 are a plurality of iron pipe spacers 37, and also a flat steel guide plate 38 shown in perspective in Fig. 3. In the particular construction shown, guide plate 38 is positioned at one side of the assembly so that this plate is directly facing the observer on the near side in the elevational view of Fig. 2. However, the plate in Fig. 2 is broken away to illustrate the construction of the parts therebeneath, which would otherwise be hidden, or partially hidden, from view. The iron pipe spacers 37 are arranged equally about the balance of the circumference of the assembly, and may be four in number. Bolts 39 extend through suitable openings in the enlarged flange 40 of housing 10, thence through openings in diaphragm retainer plate 18 and spring retainer plate 25, and then pass through the hollow spacers 37. The ends of said bolts are threaded and fastened in threaded bores formed in adapter 12 to hold the parts firmly in assembled relationship. Likewise, guide plate 38 is provided with two longitudinally extending bores 41, through which corresponding bolts 42 pass, said bolts also passing through bores in flange 40 and plates 18 and 25, and being threaded into adapter 12. The entire assembly is thus firmly held in assembled relationship and, when mounted on the pump housing, provides for substantially frictionless movement of the parts to impart longitudinal movement to the rack bar 13.

In accordance with the present invention, a vernier adjustment, without disassembly of the parts, is provided for an operative interconnection between the movable member or diaphragm 17, and the arm 44 (Fig. 2) connected to the end of rack bar 13. This vernier adjustment enables a given movement of diaphragm 17 to be translated into varying and calibrated lengths of movement of rack bar 13 to thereby maintain different fuel-air ratios with a given fuel, or to maintain a given fuel-air ratio with different fuels of differing specific gravities.

Integrally connected with cylindrical member 30 are two spaced outwardly extending lugs 46 and 47 which receive therebetween a tongue 48 integrally carried by a graduated bar 50. These parts are firmly clamped together by a bolt 51 which passes through bores in the elements 47 and 48 and is threaded in the element 46. The graduated bar 50 thus moves longitudinally with the studs 22 and 29 upon movement of bellows 17. At one end, the graduated bar 50 is formed with a rectangular guide 52, which is mounted within and slides between the opposing surfaces of a slot 53 formed in the guide plate 38. Here again, there is slight clearance between the rectangular guide 52 and the opposing edges of slot 53 to avoid frictional contact, while at the same time providing surfaces to relieve any side strain and maintain the parts in proper alignment.

The rectangular guide 52 provides a bearing for an unthreaded portion 55 of a micrometer screw 56. The upper end of graduated bar 50 carries an outwardly extending lug 57 providing a second bearing for the micrometer screw, the latter being equipped with an unthreaded portion 58 of smaller diameter which extends through the bearing with the protruding end threaded to receive double lock nuts 59 and 60. The inner lock nut 59 is not pulled tight so as to permit the micrometer screw to freely turn in its bearings, and the second lock nut 60 is pulled tight against the inner nut 59 so as to securely support and fasten the micrometer screw in position without end play. The opposite end 61 of the micrometer screw is of enlarged diameter and terminates in a knurled wheel 62 having handle 63 for manipulation. The enlarged portion 61 is equipped with vernier indicia, which are correlated with the larger scale on the graduated bar 50, whereby one complete rotation of the micrometer screw 56 corresponds to one unit of length of the scale on the graduated bar. In this manner accurate vernier adjustment of the fulcrum carrier 65, which rides up and down on the micrometer screw, is afforded.

In order to additionally support and maintain alignment of the graduated bar and micrometer screw assembly, the graduated bar 50 carries a ball-bearing roller 66 which rolls along the inner surface of the guide plate 38 at the lower edge of slot 53 (Fig. 2). The inner race of ball-bearing roller 66 is fastened securely to the side of the graduated bar 50 by screw 67 and a suitable washer, whereby the outer race is free to turn. The ball-bearing roller prevents the side force component of the conventional rack spring (not shown) for the rack bar 13 from causing binding of the enlarged portion 30 of male stud 29 against the cylindrical portion 26 of the spring retainer.

The fulcrum carrier 65 has an outwardly extending arm 69, the end of which carries a pin 70 which rides in a channel of pivot bar 71. The latter has a threaded extension 72 which is inserted in a threaded bore of pivot cylinder 73 and is locked in position by nut 74. Pivot cylinder 73 is carried by a bar 75 (Figs. 1 and 2) welded in a channel 76 formed in guide plate 38 at said lower side of slot 53 (Fig. 3). Bar 75 extends outwardly beyond plate 38 (Fig. 1), with the pivot cylinder 73 mounted in this extending portion so as to project across slot 53 (Fig. 2) at the outer side of the guide plate 38. In Fig. 2, the central portion of pivot cylinder 73 is broken away to illustrate the parts therebeneath in this side view. As shown most clearly in Fig. 2, the end of pivot cylinder 73 adjacent bar 75 carries a shaft extension 77 which passes through an eccentric bore formed in a brass insert mounted in bar 75. The brass insert has a hexagonal nut portion 78 on the upper side of bar 75, and an integral cylindrical portion 79 (shown in dotted lines in Fig. 2) which is normally fixed in position with a snug fit in a circular bore drilled through bar 75. The protruding end of said shaft extension 77 is threaded and fastened in position by double lock nuts 80 and 81. The inner lock nut 81 is not drawn tight, so that the shaft is free to rotate at all times in its bearing in the brass insert under the forces imparted through the pivot bar 71. The outer lock nut 80 is drawn tight against the inner nut 81 to hold the parts in assembled relation. By applying a wrench to hexagonal nut 78, the brass insert can be rotated in its bore within bar 75, with the result that pivot cylinder 73 is shifted longitudinally, due to its eccentricity with respect to the brass insert. In this manner the effective pivot of lever arm 71 is shifted to the left or right (Fig. 1).

The pivot bar 71 is formed with an integral extension 82 provided with a slot 83 within which rides a pin 84 carried by an arm 85. The latter has a lug 86 extending at right angles to arm 85 and provided with a bore through which passes a bolt 87 threadedly mounted in arm 44. The longitudinal position of lug 86 on threaded bolt 87 is maintained by nut 88 on one side of lug 86; and the lug 86 and the arm 85 are clamped in adjusted position by a record nut 89 at the opposite side of lug 86. This provides a third adjustment for the parts, whereby the longitudinal position of arm 44, with respect to the pin 84, can be varied by loosening nut 89, then adjusting nut 88 to the desired position, and finally refastening the parts in adjusted position.

The opposite end of arm 44 from bolt 87 is formed with spaced lugs 90 and 91 (Fig. 1) between which is clamped a tongue 92 extending from the end of rack bar 13, by means of a bolt 93 and nut 94.

By removing the bolt 51 and temporarily disconnecting the tongue 48 of graduated bar 50 from the lugs 46 and 47 of the male stud member 29, the latter can then be rotated and moved in or out with respect to the female stud member 22, to provide a longitudinal adjustment at this point for the purpose of receiving springs of different compressive strengths and to facilitate calibration. The main adjustment for calibration is generally of the pivot cylinder 73 to shift the effective pivot of lever 71 to the right or left. It will be appreciated that this adjustment will affect the angular position of the lever arm and the amount of longitudinal offset of the pivot of the lever from the fulcrum point, which alters the rate of throw of the rack throughout the range of movement of the fulcrum carrier 65 along the micrometer screw 56. Adjustment of pivot cylinder 73 may require compensating adjustment at the bolt 87, so as to bring arm 44 to the proper location with respect to pin 84. The three adjustments mentioned have been found to greatly facilitate the calibration of the controller, such that it maintains its accuracy over a wide range of fuel-air ratios for a given fuel and over a wide range of fuels of different specific gravities.

It will be understood that a table can be provided with the controller showing the proper vernier and scale readings for positioning the fulcrum carrier 65 for the different fuel-air ratios with a given fuel, as well as for fuels of different specific gravities.

The operation of the controller is thought clearly apparent from the above description. With the device mounted on the engine, the operator adjusts the fulcrum carrier 65 by turning the micrometer screw 56 to the proper vernier and scale settings for the particular fuel and the predetermined fuel-air ratio desired. Thereafter, the device functions automatically to maintain this fuel-air ratio during the operation of the engine at varying manifold pressures. When a different fuel-air weight ratio is desired with the same fuel, the fulcrum carrier 65 is adjusted by turning the micrometer screw to the new designated setting, as previously determined by calibration. Where a leaner fuel-air ratio is desired, the fulcrum carrier is moved outwardly away from the handle (upwardly as shown in Fig. 1); and the fulcrum carrier is moved inwardly to provide a richer mixture ratio. Where a different fuel is used in the engine, the fulcrum carrier is moved outwardly as the specific gravity of the fuel increases, and inwardly for lighter fuels, to maintain a given fuel-air ratio. Thus, a controller is provided which is capable of maintaining a predetermined fuel-air ratio at varying densities of air charge over a wide range of mixture ratios and with a wide range of fuels without disassembly of the parts, and with easy and quick adjustment to previously calibrated settings.

Obviously, many other modifications and variations of the invention, as hereinbefore set forth, may be made without departing from the spirit and scope thereof, and, therefore, only such

We claim:

1. In a fuel-air ratio controller of the character described, a housing having a fluid connection, a flexible diaphragm having one end connected to the outer open end of said housing to seal the space within said housing on the exterior of said diaphragm, a female stud member, the inner end of said diaphragm being connected to the inner end of said female stud member, a male stud member adjustably connected to said female stud member, said stud members extending centrally within said diaphragm and spaced substantially therefrom, a spring retainer between said diaphragm and said female stud member and spaced from the exterior of said female stud member, a cylindrical extension on said spring retainer mounted on the outer end of said housing so as to be within said diaphragm but substantially spaced from the exterior of said female stud member, the outer end of said cylindrical extension being beyond the outer end of said female stud member, a cylindrical enlargement carried by said male stud member so as to be spaced within the outer end of said cylindrical extension, a compression spring mounted within said cylindrical extension between one side of said spring retainer and said cylindrical enlargement, and an oppositely acting compression spring mounted within said diaphragm between the opposite side of said spring retainer and said female stud member.

2. A fuel-air ratio controller of the character described, comprising a housing having a fluid connection, a flexible diaphragm bellows mounted within said housing so as to be movable in response to pressure change within said housing, an adapter casing, a control arm positioned within said adapter casing, spacing members including a guide plate bolted between said adapter casing and said housing, a micrometer screw and graduated bar assembly, a rigid connection between said assembly and said diaphragm whereby said assembly moves longitudinally in response to movement to said diaphragm, a lever pivotally mounted on said guide plate, a fulcrum carrier threaded on said micrometer screw, a fulcrum pin mounted in said carrier and having a pin and slot connection with said lever to swing the lever about its pivot in response to longitudinal movement of said assembly, a pin and slot interconnection between said pivoted lever and said control arm, means associated with said assembly and said guide plate for guiding said assembly in its longitudinal movement and for maintaining alignment of said parts, and means for rotating said micrometer screw to adjust the position of said fulcrum carrier on said micrometer screw to alter the throw of said control arm for a given longitudinal movement of said diaphragm and assembly.

3. A fuel-air ratio controller according to claim 1, wherein the pivot of said lever is longitudinally adjustable, and said rigid connection and said pin and slot interconnection are both longitudinally adjustable.

4. A fuel-air ratio controller according to claim 1, wherein said guiding means includes a guide carried by said assembly riding in a slot in said guide plate and a roller carried by said assembly rolling on said guide plate.

5. A fuel-air ratio controller of the character described, comprising a control arm, a housing having a fluid connection, a bellows in said housing which is expansible and compressible in response to changing fluid pressure within said housing, a movable member connected to said bellows to have longitudinal movement in accordance with expansion and compression of said bellows, and a positive interconnection between said movable member and said control arm, said positive interconnection including an adjustable fulcrum carrier having a fulcrum pin, a calibrated micrometer screw on which said fulcrum carrier is threadedly mounted, said micrometer screw being operatively connected to said movable member for longitudinal movement therewith and to thereby impart longitudinal movement to said fulcrum carrier, and a pivoted lever slidably receiving said fulcrum pin and in turn operatively interconnected with said control arm, whereby the extent of movement of said control arm in response to a given longitudinal movement of said movable member can be controllably varied without disassembly of said parts by turning said micrometer screw to select and maintain different predetermined positions of said fulcrum carrier on said micrometer screw.

6. A fuel-air ratio controller according to claim 5, including means for longitudinally adjusting the pivot of said pivoted lever.

7. A fuel-air ratio controller of the character described, comprising a control arm, a housing having a fluid connection, a member movably mounted in said housing in response to changing fluid pressure therein, and a positive interconnection between said movable member and said control arm, such that movement of said movable member is translated directly through said positive interconnection into movement of said control arm, said positive interconnection including an adjustable fulcrum carrier having a fulcrum pin, a calibrated micrometer screw on which said fulcrum carrier is threadedly mounted, a pivoted lever slidably receiving said fulcrum pin, said micrometer screw being mounted for longitudinal movement with said movable member to impart through said fulcrum pin swinging movement to said lever about its pivot, and a pin and slot interconnection between said lever and said control arm, whereby adjustment of the position of said fulcrum carrier on said micrometer screw varies the extent of swinging movement of said lever and consequently the extent of longitudinal movement of said control arm for a given longitudinal movement of said moveable member.

8. A fuel-air ratio controller according to claim 7, wherein said micrometer screw is mounted in bearings carried by a graduated bar connected to said movable member for longitudinal movement therewith, together with a stationary guide plate having a longitudinal slot therein, said micrometer screw and graduated bar assembly having a guide riding in said slot and a roller traveling on said guide plate to hold said assembly in alignment.

9. A fuel-air ratio controller according to claim 7, wherein said pivoted lever is supported by a pivot cylinder rotatably mounted eccentrically of a supporting bearing, together with means for rotatably adjusting said bearing in its supporting frame to thereby longitudinally shift the said pivot cylinder and consequently alter the longitudinal position of the effective pivot of said pivoted lever.

10. A fuel-air ratio controller according to claim 7, wherein said movable member comprises a diaphragm bellows, and said positive interconnection includes male and female stud members adjustably connected together, one end of said diaphragm being fastened to one of said stud members and the other end being fastened to a stationary housing surrounding said members, a stationary spring retainer carried by said housing and oppositely acting compression springs mounted between said spring retainer and said male and female stud members respectively.

EDWARD V. ALBERT.
THOMAS H. RANDALL, JR.
EVERETT M. BARBER.

REFERENCES CITED

The following references are of record in the file of this patent:

UNITED STATES PATENTS

| Number | Name | Date |
|---|---|---|
| 190,066 | Nilson | Apr. 24, 1877 |
| 233,667 | French | Oct. 26, 1880 |
| 586,563 | Parsons | July 20, 1897 |
| 2,134,658 | Charley | Oct. 25, 1938 |
| 2,229,048 | Colell | Jan. 21, 1941 |
| 2,245,562 | Becker | June 17, 1941 |
| 2,277,131 | Moore | Mar. 24, 1942 |

OTHER REFERENCES

A. P. C. Publication; 265,597, May 11, 1943.

Certificate of Correction

Patent No. 2,531,243 November 21, 1950

EDWARD V. ALBERT ET AL.

It is hereby certified that error appears in the printed specification of the above numbered patent requiring correction as follows:

Column 7, line 46, for the words "to said" read *of said*; lines 64 and 70, respectively, for the claim reference numeral "1" read *2*;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*